United States Patent
Sinha

(10) Patent No.: US 9,304,655 B2
(45) Date of Patent: Apr. 5, 2016

(54) GRAPHICAL USER INTERFACE (GUI) THAT RECEIVES DIRECTIONAL INPUT TO CHANGE FACE FOR RECEIVING PASSCODE

(71) Applicant: Akshay Sinha, Bangalore (IN)

(72) Inventor: Akshay Sinha, Bangalore (IN)

(73) Assignee: SAP SE, Walldorf (DE)

( * ) Notice: Subject to any disclaimer, the term of this patent is extended or adjusted under 35 U.S.C. 154(b) by 413 days.

(21) Appl. No.: 13/756,748

(22) Filed: Feb. 1, 2013

(65) Prior Publication Data

US 2014/0223378 A1 Aug. 7, 2014

(51) Int. Cl.
*G06F 21/36* (2013.01)
*G06F 3/0481* (2013.01)
*G06F 21/45* (2013.01)
*G06F 21/46* (2013.01)
*G06F 21/31* (2013.01)

(52) U.S. Cl.
CPC ............ *G06F 3/04817* (2013.01); *G06F 21/36* (2013.01); *G06F 21/31* (2013.01); *G06F 21/45* (2013.01); *G06F 21/46* (2013.01)

(58) Field of Classification Search
CPC ..... G06F 3/04817; G06F 21/36; G06F 21/46; G06F 21/31; G06F 21/30; G06F 21/45; G06F 2211/003
USPC .......................................................... 715/836
See application file for complete search history.

(56) References Cited

U.S. PATENT DOCUMENTS

| | | | |
|---|---|---|---|
| 4,926,481 A * | 5/1990 | Collins, Jr. ..................... | 713/184 |
| 5,303,388 A * | 4/1994 | Kreitman et al. ............. | 715/836 |
| 5,751,980 A * | 5/1998 | Musashi et al. ............... | 715/840 |
| 6,597,347 B1 * | 7/2003 | Yasutake ........................ | 345/173 |
| 7,596,701 B2 * | 9/2009 | Varghese et al. .............. | 713/182 |
| 7,873,995 B2 * | 1/2011 | Bagga et al. .................... | 726/19 |
| 7,908,645 B2 * | 3/2011 | Varghese et al. ................. | 726/4 |
| 7,941,834 B2 * | 5/2011 | Beck et al. ......................... | 726/6 |
| 8,400,474 B2 * | 3/2013 | Yoshida ........................ | 345/650 |
| 8,655,413 B2 * | 2/2014 | Kim et al. ..................... | 455/566 |

(Continued)

FOREIGN PATENT DOCUMENTS

| | | | | |
|---|---|---|---|---|
| GB | 2425700 A | | 11/2006 | |
| GB | 2456208 A | * | 7/2009 | ................ A63F 9/12 |

(Continued)

OTHER PUBLICATIONS

European Search Report for EP Application No. 14000272.6, mailed Apr. 4, 2014, 5 pages.

(Continued)

*Primary Examiner* — Ece Hur

(74) *Attorney, Agent, or Firm* — Brake Hughes Bellermann LLP

(57) ABSTRACT

A non-transitory computer-readable storage medium includes instructions stored thereon. When executed by at least one processor, the instructions may be configured to cause a computing system to at least generate a graphical user interface (GUI), receive selections of characters and directional input, and compare the selections of the characters and the directional input to a stored passcode combination. The GUI may include at least one face and a plurality of buttons inside the at least one face. At least some of the plurality of buttons may include characters in a random or pseudorandom sequence. The GUI may be configured to receive selections of the characters and directional input to the at least one face.

18 Claims, 17 Drawing Sheets

(56) References Cited

U.S. PATENT DOCUMENTS

| | | | |
|---|---|---|---|
| 8,739,278 B2* | 5/2014 | Varghese | 726/22 |
| 8,799,207 B1* | 8/2014 | Stolte et al. | 707/602 |
| 8,931,070 B2* | 1/2015 | Syarif et al. | 726/7 |
| 2003/0232636 A1* | 12/2003 | Ionescu | 463/9 |
| 2006/0020815 A1* | 1/2006 | Varghese et al. | 713/182 |
| 2009/0172810 A1 | 7/2009 | Won et al. | |
| 2009/0187862 A1* | 7/2009 | DaCosta | 715/836 |
| 2010/0169836 A1* | 7/2010 | Stallings et al. | 715/848 |
| 2011/0090145 A1* | 4/2011 | Lu | 345/156 |
| 2012/0302303 A1* | 11/2012 | Rosendo | 463/9 |
| 2013/0139248 A1* | 5/2013 | Rhee et al. | 726/19 |
| 2014/0068754 A1* | 3/2014 | Burkill | 726/18 |
| 2014/0258938 A1* | 9/2014 | Christmas et al. | 715/849 |
| 2015/0135289 A1* | 5/2015 | Hosabettu et al. | 726/6 |

FOREIGN PATENT DOCUMENTS

| | | |
|---|---|---|
| WO | 2007042857 A1 | 4/2007 |
| WO | 2011124275 A1 | 10/2011 |

OTHER PUBLICATIONS

European Summons to Attend Oral Hearing for EP Application No. 14000272.6, mailed Nov. 12, 2015, 6 pages.

* cited by examiner

GRAPHICAL USER INTERFACE (GUI) THAT RECEIVES DIRECTIONAL INPUT TO CHANGE FACE FOR RECEIVING PASSCODE

TECHNICAL FIELD

This description relates to computer security, including entering and receiving a passcode.

BACKGROUND

Passcodes, e.g., passwords, are used to ensure an identity of a user logging into a computer system. Passcodes may, for example, be combinations of letters, numbers, and/or other symbols on a keyboard. Unauthorized persons may learn a user's passcode and access the user's account without permission.

An unauthorized person may, for example, look over the user's shoulder and watch the keys that the user is typing. An unauthorized person may also employ a "brute force attack," simply attempting all possible alphanumeric combinations until gaining access. An unauthorized person may also use malware that records what the user types, or takes screenshots during the login process. In a corporate setting, an unauthorized user may guess the passcode by guessing words connected to the business. All of these techniques create risks of security breaches.

SUMMARY

According to one general aspect, a non-transitory computer-readable storage medium may include instructions stored thereon. When executed by at least one processor, the instructions may be configured to cause a computing system to at least generate a graphical user interface (GUI), receive selections of characters and directional input, and compare the selections of the characters and the directional input to a stored passcode combination. The GUI may including at least one face and a plurality of buttons inside the at least one face. At least some of the plurality of buttons may include characters in a random or pseudorandom sequence. The GUI may be configured to receive selections of the characters and directional input to the at least one face.

According to another general aspect, a non-transitory computer-readable storage medium may include instructions stored thereon for implementing a secure computer passcode interface. The instructions may be configured to cause a computing system to at least generate a graphical user interface (GUI) for entering a passcode. The graphical user interface may include a polyhedron with multiple faces. Each of the multiple faces may include a plurality of shapes. At least some of the plurality of shapes on each of the multiple faces may include a character. The GUI may be configured to receive selections of shapes representing the characters included therein and directional input to change which of the multiple faces is displayed.

According to another general aspect, a non-transitory computer-readable storage medium may include instructions stored thereon. When executed by at least one processor, the instructions may be configured to cause a computing system to at least generate a graphical user interface (GUI), receive selections of characters and directional input, and store the selections of the characters and the directional input for later comparison during a login attempt. The GUI may include at least one face and a plurality of buttons inside the at least one face. At least some of the plurality of buttons may include characters in a random or pseudorandom sequence. The GUI may be configured to receive selections of the characters and directional input to the at least one face.

The details of one or more implementations are set forth in the accompanying drawings and the description below. Other features will be apparent from the description and drawings, and from the claims.

DETAILED DESCRIPTION

Figure 1A:
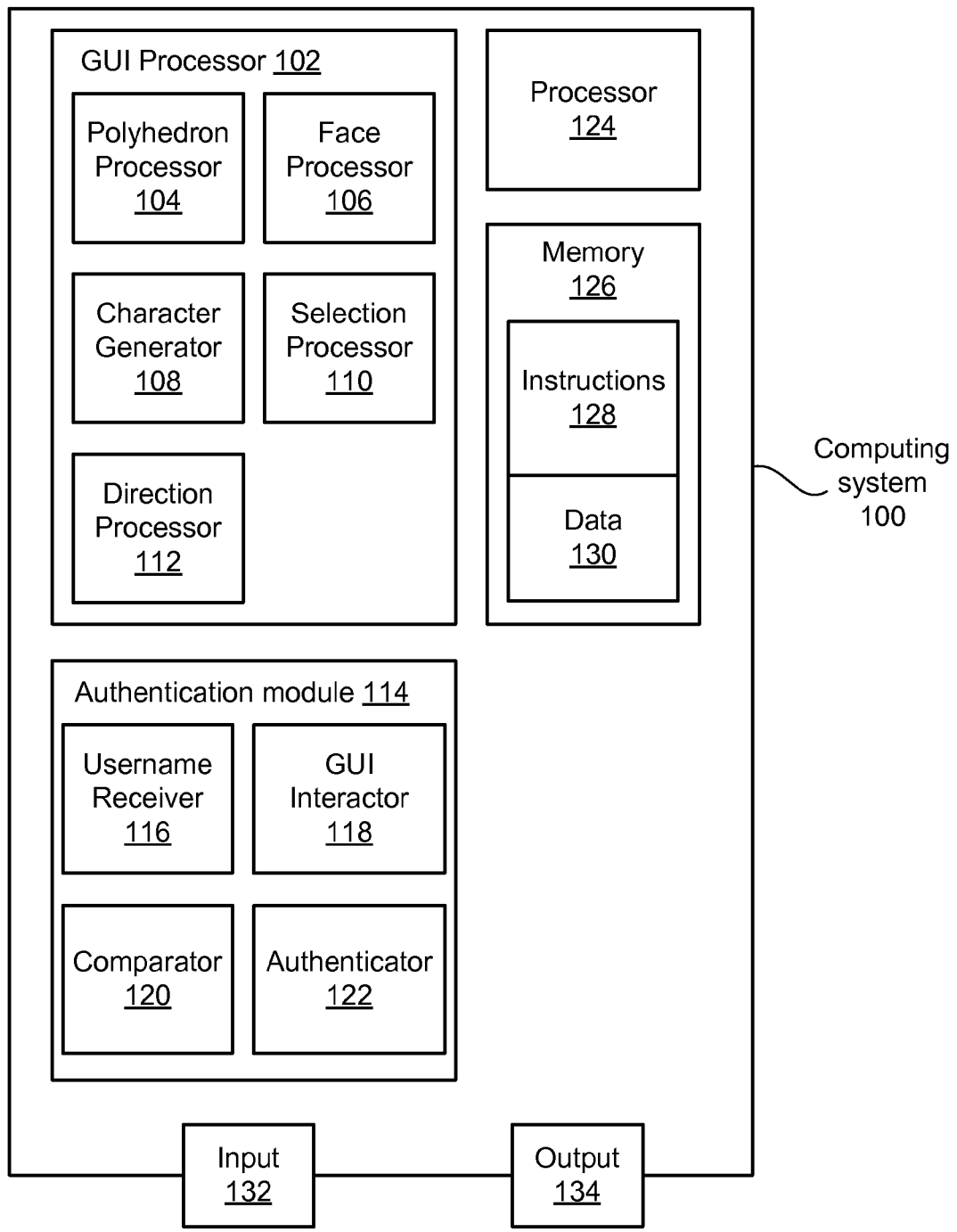
FIG. 1A is a block diagram of a computing system for receiving a passcode according to an example implementation.

FIG. 1A is a block diagram of a computing system 100 for receiving a passcode according to an example implementation. The computing system 100 may receive the passcode, for setting a user's passcode and/or for authenticating the user to login, via a graphical user interface (GUI). The GUI (shown and described with respect to FIGS. 2A, 2B, 2C, 2D, 4A, 4B, 4C, 4D, 4E, 4F, 4G, and 4H) may include, for example, a polyhedron such as a cube. The computing system 100 may present the polyhedron to a user in three dimensions, with more than one face or side visible to the user, or in two dimensions, with only one face visible to the user. The faces may be in shapes based on the type of polyhedron. For example, a cubic or rectangular polyhedron may have square or rectangular faces, whereas a pyramidal polyhedron may have triangular faces. The faces in the shapes of the polyhedron may include buttons for receiving input from the user. The buttons may include characters, such as alphanumeric characters and/or other characters, such as characters included on a keyboard. The GUI may receive selections of the characters by the user clicking on the buttons with a mouse or, in an example of a touchscreen interface, the user touching the buttons. The GUI may receive directional input from the user, allowing the user to change which face the computing system 100 presents to him or her. The computing system 100 may store the selected characters, as well as the faces of the polyhedron on which the characters were selected and/or the path or directional input to the faces before the selection. The stored characters and faces and/or path may be stored as the user's passcode for future authentication, and/or may be compared to a stored passcode to authenticate a login attempt.

Figure 1B:
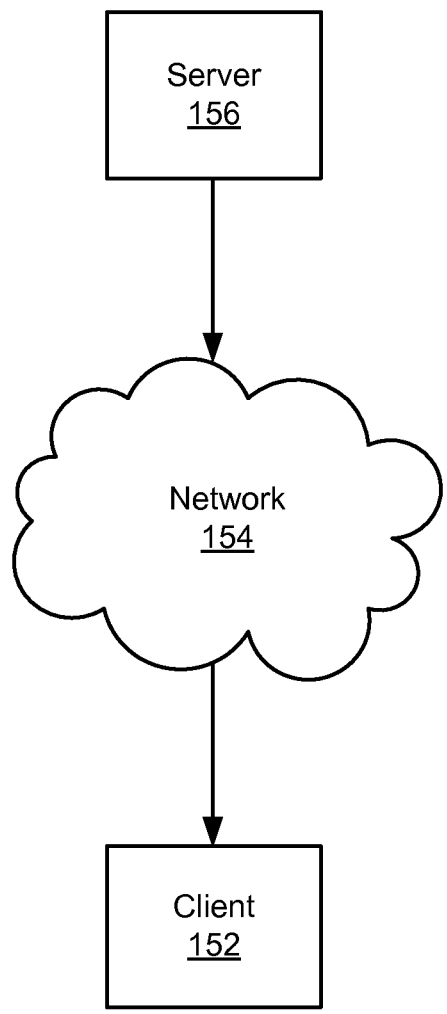
FIG. 1B is a diagram of a network in which a passcode may be entered according to an example implementation.

The components of the computing system 100 may operate within a standalone device, receiving, storing, and later comparing the passcode, or may operate within a network as a distributed system. FIG. 1B is a diagram of a network in which a passcode may be entered according to an example implementation. In this example, a client device 152 may receive input from a user. The client device 152 may communicate with a server 156 via a network 154. The server 156 may be in a location remote to the client device 152. The network 154 may include, for example, the Internet, a local area network (LAN), wide area network (WAN), or other network which enables computing devices to communicate with each other. In an example implementation, the functions of the computing system 100 described herein may be distributed between the client device 152 and the server 156. For example, the server may generate a GUI and send the image to the client device 152 via the network 154. The client device 152 may receive input from the user, such as mouse clicks and mouse movements, or touchscreen contacts and swipes, and send the input to the server 156 via the network 154. The server 156 may process the input, such as by storing selections of characters and directional input, and rotating or changing the face of the polyhedron. In an example in which the polyhedron rotates less than one face at a time, the server 156 may change the image of the GUI including the polyhedron, and send the changed image to the client device 152. While two computing devices, the client device 152 and the server 156, are shown in FIG. 1B, the functions of the computing system 100 may be distributed among any number of computing devices.

Returning to FIG. 1A, the computing system 100 may include a GUI processor 102. The GUI processor 102 may generate a GUI and receive input from a user via the GUI. The GUI generated by the GUI processor 102 may include, for example, a polyhedron, such as a cube, with multiple faces. Each of the multiple faces may include buttons. The buttons may include or represent, and/or be associated with, characters. The characters may include letters, numbers, and other characters, such as characters included on a keyboard. The characters may be arranged on the buttons in a random or pseudorandom sequence. In an example implementation, the characters may be arranged in the same sequence on each of the faces, so that the faces all look the same and the GUI will look the same when a new face is presented and/or facing the user. The GUI may present the characters in a new random or pseudorandom sequence on the buttons when a new GUI is generated and/or when the GUI is refreshed. In another example implementation, the characters may be arranged in different random or pseudorandom sequences on each face.

The GUI processor 102 may include a polyhedron processor 104. The polyhedron processor 104 may generate a polyhedron, such as a cube, for the GUI. The polyhedron processor 104 may, for example, generate the polyhedron with a predetermined size for each of the faces. The predetermined size may be measured in pixels, and may be based on a size of a display of the computing system 100. The polyhedron processor 104 may generate a polyhedron that the user can rotate through various degrees, or a polyhedron which can have only one face showing at a time, and which jumps between discrete rotational positions, with the number of allowed positions being equal to the number of faces on the polyhedron. The polyhedron may rotate, or change which face is presented to the user, in response to directional input from the user. The directional input may include clicking or touching and dragging the polyhedron, or clicking or touching directional buttons associated with the polyhedron.

The GUI processor 102 may also include a face processor 106. The face processor 106 may generate each of the faces of the polyhedron. The face processor 106 may, for example, generate buttons for each of the faces of the polyhedron. In an example in which the polyhedron is a cube, and the faces are rectangular and/or square, the buttons may be rectangular or and/square. The buttons may receive input from the user, such as the user clicking on, tapping, or touching the buttons. The GUI processor 102 may process the input received from the user via the buttons, such as recognizing selections of characters associated with the buttons that the user clicked on, tapped, or touched.

The GUI processor 102 may also include a character generator 108. The character generator may generate and/or determine the characters associated with, included in, and/or displayed within the buttons in each of the faces of the polyhedron. The characters may include alphanumeric characters included on a keyboard. The characters may include, for example, the twenty-six letters 'a' through 'z' (in either upper-case, lower-case, or both), the ten digits '1' through '0' (or '0' through '9'), and other characters, such as '@', '#', '$', and '_'. In an example embodiment, the characters may include characters from other alphabets, such as Hebrew, Greek, Cyrillic, Sanskrit, in accordance with options selected by a user. The characters included in the buttons may also include blanks or null values, for buttons which will not include a character and may be considered blank or null. The user may or may not be allowed to select buttons with blanks or null values, according to example implementations.

The character generator 108 may generate, and/or associate the characters with or assign the characters to, the buttons, in a random or pseudorandom sequence or pattern. In an example implementation, the characters may have the same sequence or pattern for each of the faces of the polyhedron, so that when the polyhedron is rotated and/or has a new or different face presented to the user, the characters will be presented to the user in the same sequence or pattern and a hacker may not be able to determine that the polyhedron has been rotated. The characters will be generated in a new sequence or pattern when a new instance of the polyhedron is generated, such as at a new or subsequent login attempt, or if the user refreshes the GUI. The different sequence or pattern of the characters for each login may make it difficult for a hacker tracking mouse movements or touchscreen contact locations to determine which characters are selected by the user, because the locations of the characters within the face of the polyhedron are different for each login attempt.

Figure 2A:
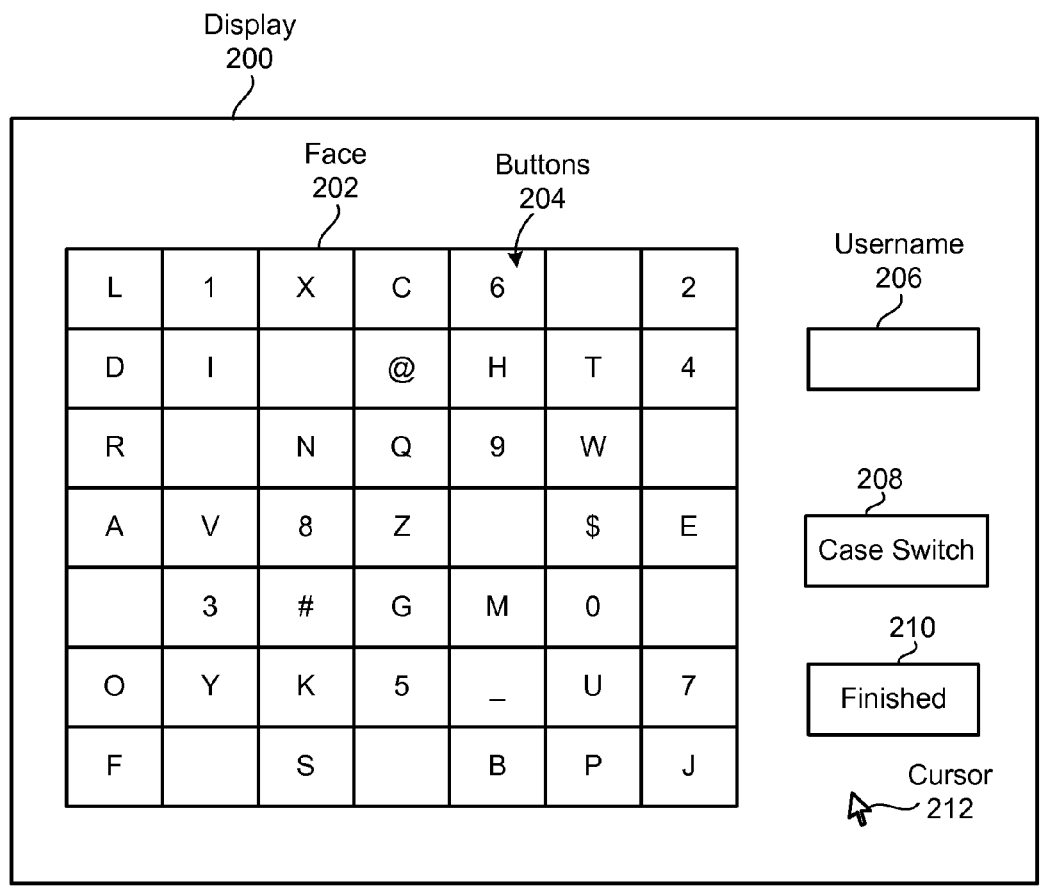
FIG. 2A is a diagram of a display including a graphical user interface (GUI) for receiving a passcode according to an example implementation.

FIG. 2A is a diagram of a display 200 including a graphical user interface (GUI) for receiving a passcode according to an example implementation. The GUI may have been generated by the GUI processor 102 described above. In this example, the GUI may include a cubic polyhedron represented in two dimensions, with a single face 202 displayed or presented to the user. While the single face 202 is displayed to the user, other faces are part of the polyhedron and may be displayed to the user in response to directional input.

In this example, the face 202 is rectangular or square, and the buttons 204 are rectangles or squares. The face 202 includes seven square buttons across by seven square buttons down, forming a seven-by-seven (7×7) square of forty-nine (49) buttons 204. In this example, forty of the buttons 204 include characters, and nine of the buttons are blank. The forty buttons 204 that include characters each include a single character. The buttons 204 include the twenty-six letters 'A' through 'Z', ten digits '1' through '0' (or '0' through '9'), and four characters '@', '$', '#', and '_'. The buttons 204 may be associated with, or assigned to, the character included or displayed therein. If the user clicks on, taps, or contacts a button 204 containing a character, then the computing system 100 may recognize a selection of the character contained by the clicked, tapped, or contacted button 204.

The display 200 may include, display, or present a username field 206 for the user to enter his or her username. The user may type his or her username into the username field 206, or may use the polyhedron, including the buttons 204 on the face 202, to enter his or her username.

The display 200 may also include, display, or present a case switch button 208. In the example shown in FIG. 2A, the letters included in the buttons 204 of the face 202 are in upper-case. The passcode may be case-insensitive, rendering the case of the letters irrelevant. Or, the passcode may be case-sensitive, requiring the user to enter the passcode in the correct case. The user may click on, tap, or contact the case switch button 208 to change the case or the letters displayed in the buttons 204 of the face 202 for the purpose of entering a case-sensitive passcode, or for personal viewing preferences.

The display 200 may also include, display, or present a finished button 210. The user may click the finished button 210 to indicate that he or she is finished entering his or her passcode, prompting the computing system 100 to either store or compare the entered passcode. The username field 206, case switch button 208, and/or finished button 210 may be considered part of the same GUI as the polyhedron including the face 202 and buttons 204, or may be considered separate GUIs and/or interactors. In an example in which the user interacts with the computing system 100 using a mouse, the display 200 may also include, display, or present a cursor 212. The cursor may show the location of input on the display 200.

Figure 2B:
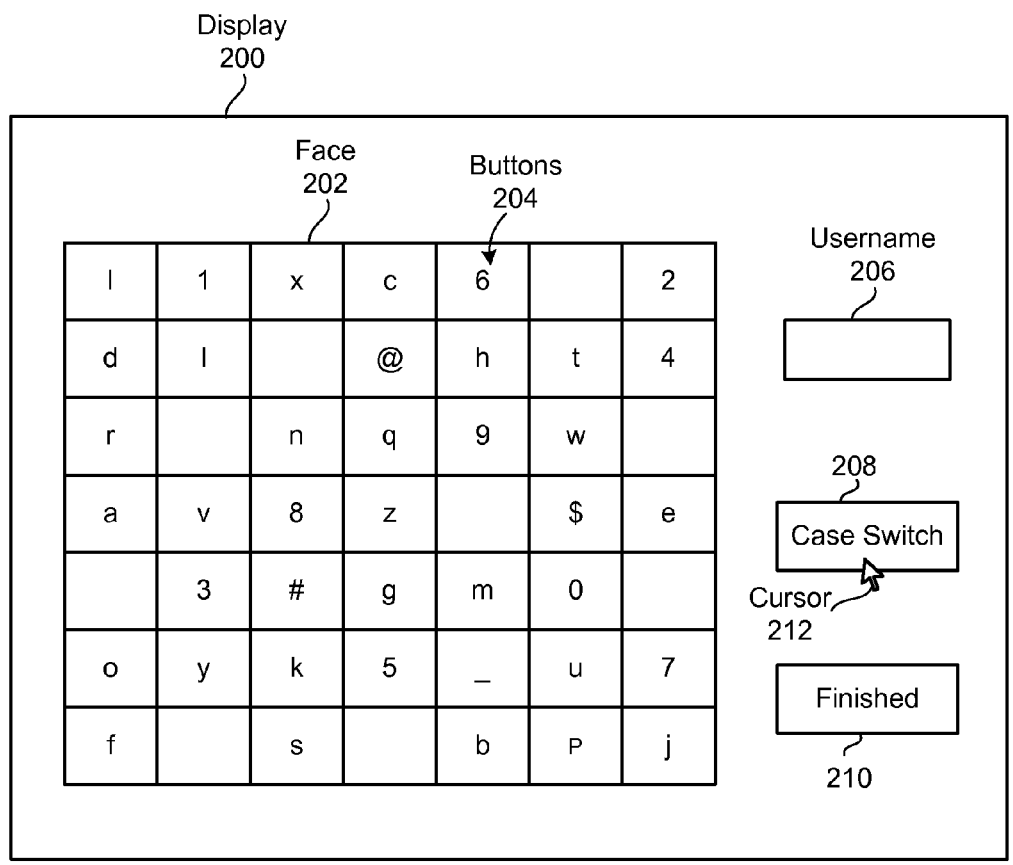
FIG. 2B is a diagram of the display and GUI of FIG. 2A according to an example implementation in which the letters in the buttons have been switched to lower case.

FIG. 2B is a diagram of the display 200 and GUI of FIG. 2A according to an example implementation in which the letters in the buttons 204 have been switched to lower case. In this example, the user has clicked on, tapped, or contacted the case switch button 208. The user may have clicked on or tapped the case switch button 208 using the cursor 212. In response to the user clicking on, tapping, or contacting the case switch button 208, the GUI processor 102 and/or character generator has changed the case of the letters included in the buttons 204 from upper-case to lower-case. The GUI processor 102 and/or character generator may also change the case of the letters included in the buttons 204 from lower-case to upper-case in response to the user clicking on, tapping, and/or contacting the case switch button 208.

Figure 2C:
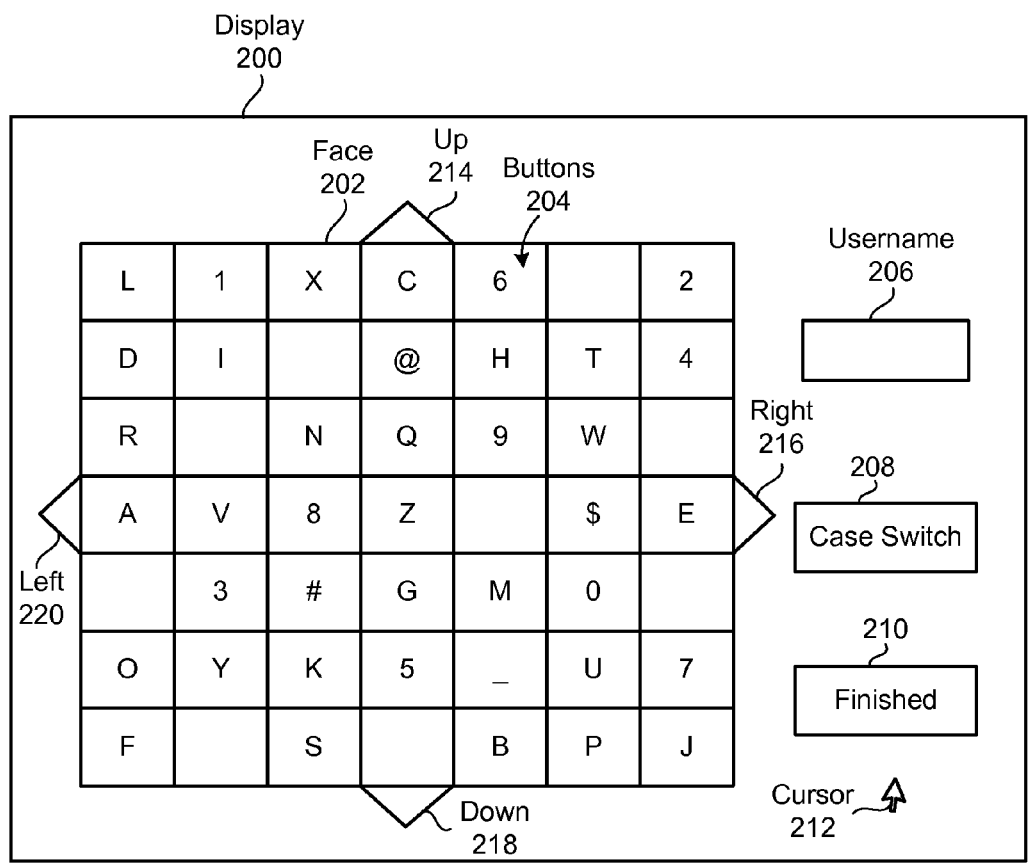
FIG. 2C is a diagram of a display and GUI for receiving a passcode according to an example implementation in which the GUI includes directional buttons.

FIG. 2C is a diagram of the display 200 and GUI for receiving a passcode according to an example implementation in which the GUI includes directional buttons. In this example, the GUI, including the polyhedron of which the face 202 is displayed, includes an up button 214, a right button 216, a down button 218, and a left button 220. The user may click on, tap, and/or contact the up button 214, right button 216, down button 218, and/or left button 220 to rotate the polyhedron up, right, down, or left, respectively. In examples in which the face has a different number of sides, such as a triangular face with three sides or a hexagonal face with six sides, the GUI may include a different number of directional buttons, such as a number of directional buttons equal to the number of sides on the face.

Figure 2D:
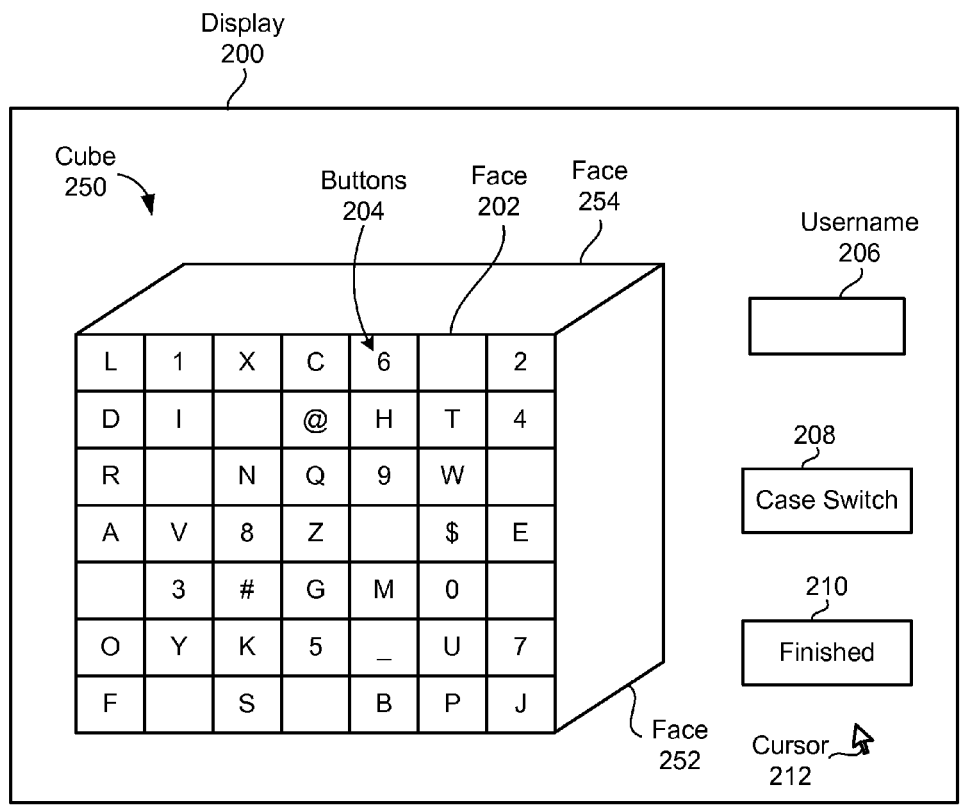
FIG. 2D is a diagram of a display and GUI for receiving a passcode in an example in which the polyhedron is a three-dimensional cube.

FIG. 2D is a diagram of the display 200 and GUI for receiving a passcode in an example in which the polyhedron is a three-dimensional cube 250. In this example, the three-dimensional cube 250 presents the face 202 to the user. Other faces, such as faces 252, 254, may also be visible to the user. However, the other faces 252, 254 may not present buttons to the user as available for selection. In this three-dimensional GUI example, only a single face 202 may present buttons 204 to the user as available for selection. The other faces 252, 254 (and other faces not shown in FIG. 2D) may not present buttons while the face 202 is presenting buttons 204, but may present buttons as available for selection after the user has rotated the cube 250 so that the other faces 252, 254 are facing the user. The user may rotate the cube 250 using buttons similar to those shown in FIG. 2C, or by dragging or swiping a mouse or finger across the cube 250. In an example in which the cube 250 is rotated by dragging or swiping, the cube 250 may rotate in discrete amounts, rotating to present a new face with each drag or swipe, or may rotate in smaller amounts, allowing the user to rotate the cube 250 by less than that required to present a new face to the user.

Returning to FIG. 1A, the GUI processor 102 may include a selection processor 110. The selection processor 110 may process selections of characters by the user. The selection processor 110 may, for example, process mouse clicks on, or touches onto, the buttons associated with characters. The selection processor 110 may store the characters selected by the user. The face processor 106 may or may not highlight the buttons selected by the user. Highlighting the buttons may provide feedback to the user to confirm that the button was selected, but may also make it easier for a hacker to determine which characters were selected. The GUI processor 102 may process the selections of characters and/or buttons without highlighting or otherwise providing any graphical or other indication of which buttons or characters were selected to improve security. The selection processor 110 may store the selected characters in association with directional input processed by a direction processor 112.

The GUI processor 102 may include the direction processor 112. The direction processor 112 may process directional input received from the user. The directional input received from the user may include, for example, a mouse click-and-drag gesture, a swipe gesture on a touchscreen, a click or touch on a directional button, or character input, such as up, down, left, or right arrow keyboard input. The directional input may change which face is facing or presented to the user. The direction processor 112 may rotate the polyhedron in response to the directional input. The direction processor 112 may rotate the polyhedron by one face at a time, so that a face adjacent to the face presented to or facing the user is presented to the user, or, in an example of a three-dimensional presentation of the polyhedron, may rotate the polyhedron by less than a full face, so that multiple inputs are required to change which face is facing the user.

The direction processor 112 may store the directional inputs. The direction processor 112 may store, for example, the directions inputted to change which face is facing or presented to the user. The direction processor 112 may store, for example, the directional inputs preceding a selection of a character.

Figure 3:
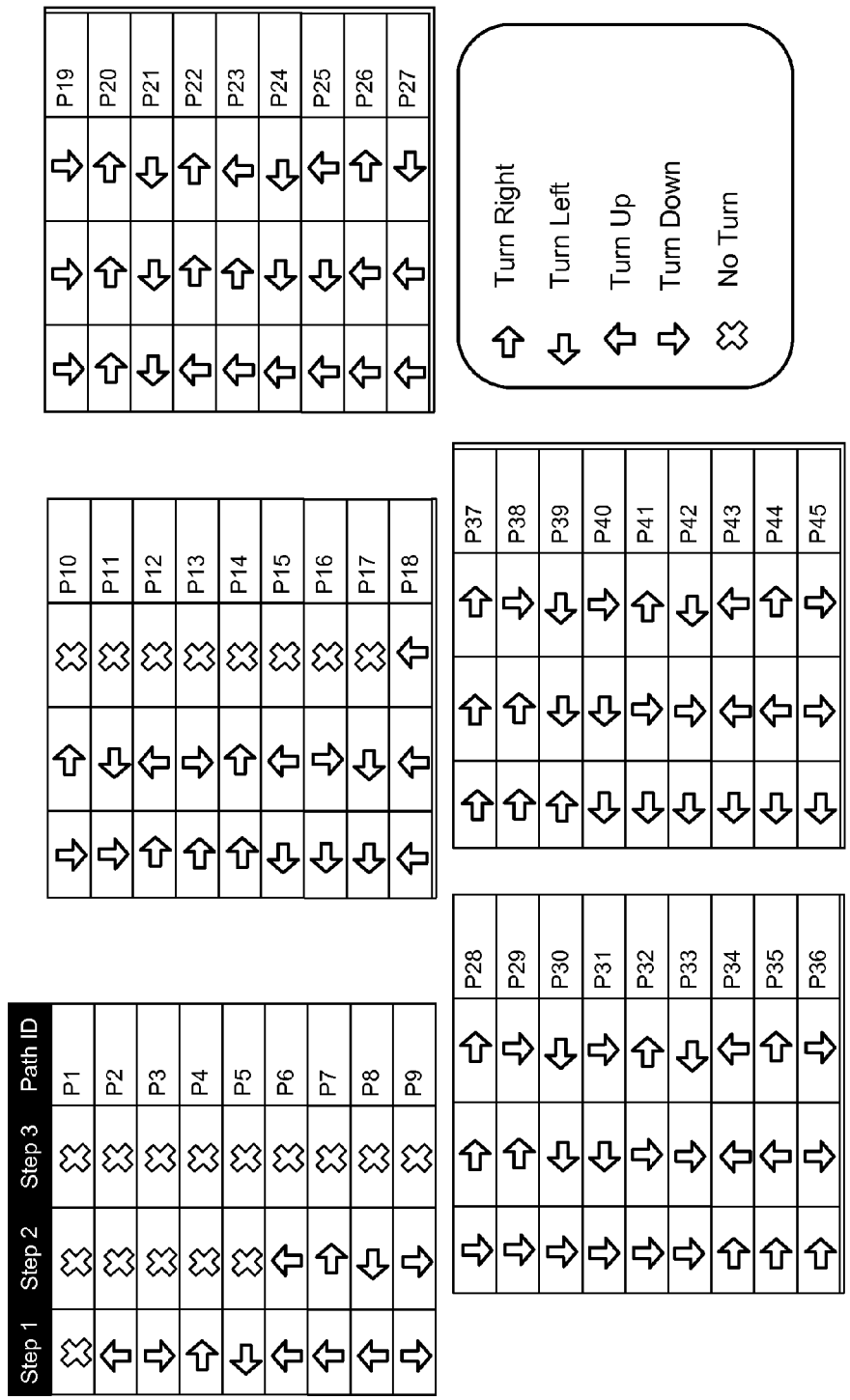
FIG. 3 shows tables with path identifiers according to an example implementation.

FIG. 3 shows tables with path identifiers according to an example implementation. In the example tables of FIG. 3, the steps, or directional inputs, leading to a face from which a character is selected, are associated with a path identifier (Path ID). For example, if no directional input is received by the direction processor before the character selection is received, the path ID P1 may be stored. If one up directional input was received, then the path ID P2 may be stored. If an up directional input and a right directional input were received, then the path ID P7 may be stored. If two up directional inputs were received and then a left directional input, then the path ID P27 may be stored. The path identifiers shown in FIG. 3 may be used in an example in which the polyhedron is a cube, and a maximum of three directional inputs changing the face of the cube may be required to get to a desired face. Different path identifiers may be used for other types of polyhedrons. In an example implementation an eight-character textual passcode, "sunshine," may be stored as "s(P14)u(P2)n(P30)s (P30)h(P21)i(P8)n(P10)e(P45)" to reflect that the first 's' was selected after two right directional inputs or rotations, the 'u' was selected after one up directional input or rotation, the first 'n' was selected after a down directional input or rotation followed by two left directional inputs or rotations, the second 's' was selected after a down directional input or rotation followed by two left directional inputs or rotations, the 'h' was selected after three left directional inputs or rotations, the 'i' was selected after an up directional input or rotation followed by a left directional input or rotation, the second 'n' was selected after a down directional input or rotation followed by a right directional input or rotation, and the 'e' was selected after a left directional input or rotation followed by two down directional inputs or rotations.

Returning to FIG. 1A, the direction processor 112 may also maintain, store, or process a position of the polyhedron. The direction processor 112 may, for example, maintain which face of the polyhedron is facing or presented to the user. The direction processor 112 may maintain, for example, a face number of the polyhedron that is facing or presented to the user. In an example in which the polyhedron is a cube, the direction processor 112 may maintain whether face number 1, 2, 3, 4, 5, or 6 is facing or presented to the user. The face and/or face number from which a character is selected may be stored in association with the character that is selected from the respective face. The direction processor 112 may provide the inputted direction to the polyhedron processor 104 and/or face processor 106, allowing the polyhedron processor 104 and/or face processor 106 to change the polyhedron and/or face in response to the directional input. The polyhedron processor 104 and/or face processor 106 may or may not show the face number. Showing the face number will assist the user in selecting the next character from a desired face, but not showing the face number may make it more difficult for a hacker to determine which face the character was selected from.

The GUI processor 102 may store the selections of characters processed by the selection processor 110 in association with the directional input processed by the direction processor 112 and/or the position of the polyhedron. In an example in which the directional processor maintains the position of the polyhedron, the GUI processor may store the selected characters and an indicator of the face from which each of the characters was selected. For example, the eight-character textual passcode, "sunshine," may be stored as "s(2)u(5)n(1)s(3) h(3)i(6)n(4)e(1)," to reflect that the first 's' was selected from the second face, the 'u' was selected from the fifth face, the first 'n' was selected from the first face, the second 's' was selected from the third face, the 'h' was selected from the third face, the 'i' was selected from the sixth face, the second 'n' was selected from the fourth face, and the 'e' was selected from the first face. In an example in which the paths to the faces are stored, and the path ID table of FIG. 3 is used, a three-character textual passcode, "SAP," selected as an example shown and described with respect to FIGS. 4A through 4H, may be stored as "S(P1)A(P4)P(P6)," to reflect that no directional input to change the face was received before the 'S' was selected, a single right input was received before the 'A' was selected, and two up inputs were received before the 'P' was selected.

The computing system 100 may also include an authentication module 114. The authentication module 114 may receive and store a username and associated passcode. The authentication module 100 may, for example, receive and store the username and passcode received via the GUI generated by the GUI processor 102, for purposes of storing the user's passcode and later authentication of the user. The authentication module 100 may also compare the username and passcode received via the GUI generated by the GUI processor 102.

The authentication module 114 may include a username receiver 116. The username receiver 116 may receive a username received from the user, such as via the username field 206 shown in FIGS. 2A, 2B, 2C, and 2D. The username receiver 116 may, for example, interact with the GUI processor 102 to receive the username entered into the username field 206.

The authentication module 114 may also include a GUI interactor 118. The GUI interactor 118 may receive the user's inputs to the GUI, such as the user's directional input and the selections of characters. The GUI interactor 118 may interact with the GUI processor 102 to receive input into the GUI. The GUI interactor may also store the entered passcode, including the selected characters and directional input, and/or may pass the entered passcode to a comparator 120.

The authentication module 114 may include the comparator 120. The comparator 120 may compare the entered passcode to a stored passcode. The stored passcode may be stored in association with the username received during a login attempt. The comparator 120 may determine whether the entered passcode matches or does not match the stored passcode. The comparator may pass the result, a "match" or "no match" for example, to an authenticator 122.

The authentication module 114 may include the authenticator 122. The authenticator 122 may authenticate or not authenticate, such as by allowing or denying a logon request, based on the match or no match received from the comparator 120. The authenticator 122 may, for example, grant or deny the user access to an account associated with the username entered into the username field 206.

The computing system 100 may include at least one processor 124. The at least one processor 124 may be capable of executing instructions and performing calculations to execute the processes and functions described herein. The at least one processor 124 may include one or more general purpose processors, such as an x86 processor, an ARM processor(s), or a MIPS processor(s), or may include an application-specific integrated circuit(s) (ASIC) designed to perform the processes and functions described herein.

The computing system 100 may also include a memory 126. The memory 126 may include any form of volatile or non-volatile memory. The memory 126 may include instructions 128 for execution by the processor 124. The memory 126 may include, for example, at least one non-transitory computer-readable storage medium comprising instructions stored thereon that, when executed by the at least one processor 124, are configured to cause the computing system 100 to perform any combination of the functions and processes described herein. The memory 126 may also include data 130. The data 130 may include the username and associated stored passcode, selected characters, faces and/or directional input associated with each character selection, case selection (upper or lower), or any other data stored by the computing system 100.

The computing system 100 may also include input and output nodes 132, 134. The input and output nodes 132, 134 may be separate nodes, or may be combined into a single node. The input and output nodes 132, 134 may each include multiple interfaces. For example, the input node 140 may include a keyboard and mouse and/or a touchscreen for user input, and may include a wired or wireless communication interface for receiving signals from one or multiple computing devices. The output node 142 may include a display or monitor (which may be a touchscreen) as well as a wired or wireless communication interface for sending signals to one or multiple computing devices.

FIGS. 4A through 4H show entry of a username and passcode into the GUI of FIG. 2C according to an example implementation. In the example shown in FIG. 4A, the user may enter his username, "JOHNDOE," into the username field 206. The computing system 100 may store the entered username for retrieval of an associated passcode and account. FIGS. 4B through 4G show selection of a three-character passcodes, "SAP". Passcodes will typically be longer than three characters, but selection of the passcode "SAP" is shown and described for illustrative purposes.

Figure 4A:
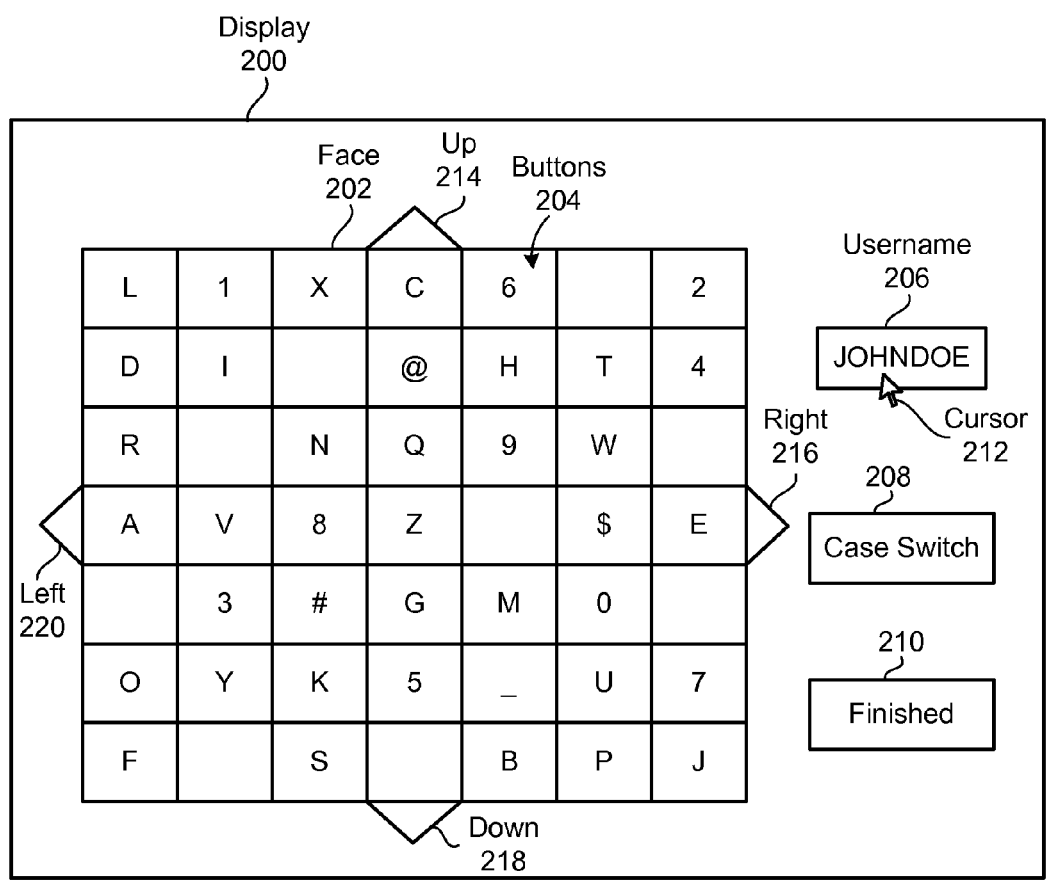
FIGS. 4A through 4H show entry of a username and passcode into the GUI of FIG. 2C according to an example implementation.
Figure 4B:
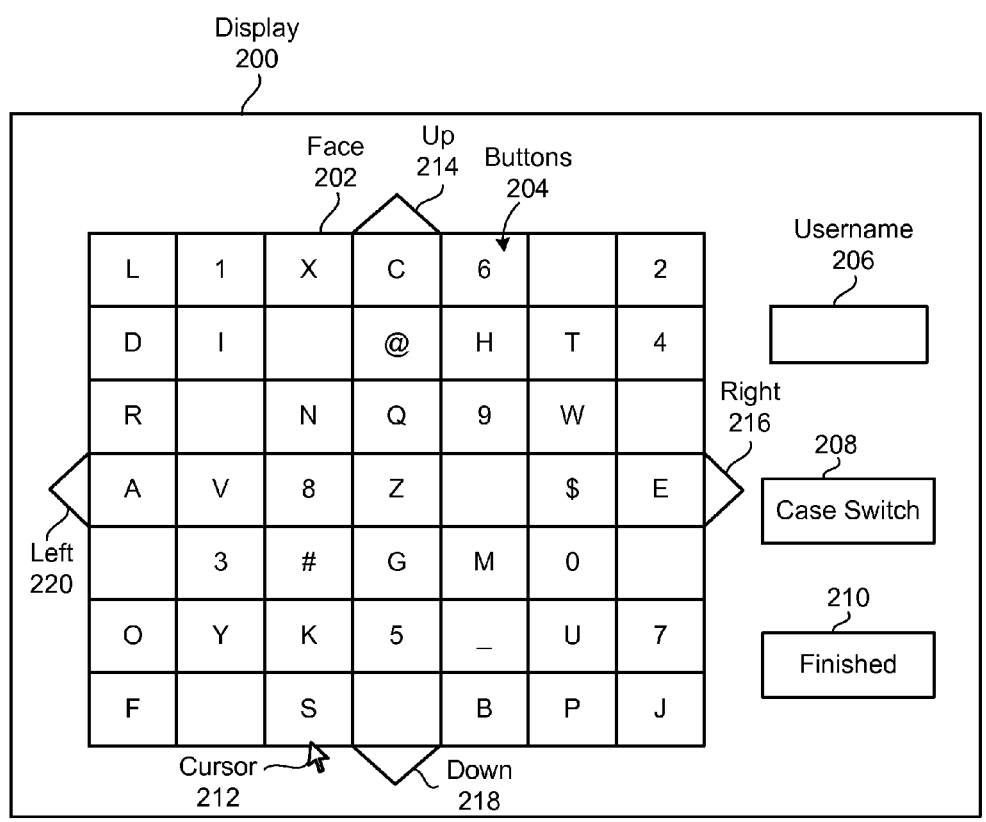

In the example shown in FIG. 4B, the user may select the character "S" by clicking, tapping, or contacting the button 204 that displays and/or includes the letter "S". The button 204 that includes the letter "S" may or may not be highlighted upon selection. The user may have selected the character "S" without first entering directional input. Based on the user's selection of the character "S" without first providing directional input, the character "S" may have been selected from the first face 202 of the cube or polyhedron. In an example in which the computing system 100 stores the character and the face 202 from which the character was selected, the computing system 100 may store the selection as "S(1)." In an example in which the computing system 100 stores the selected character and the directional path using the tables shown in FIG. 3, the computing system may store the selection as "S(P1)."

Figure 4C:
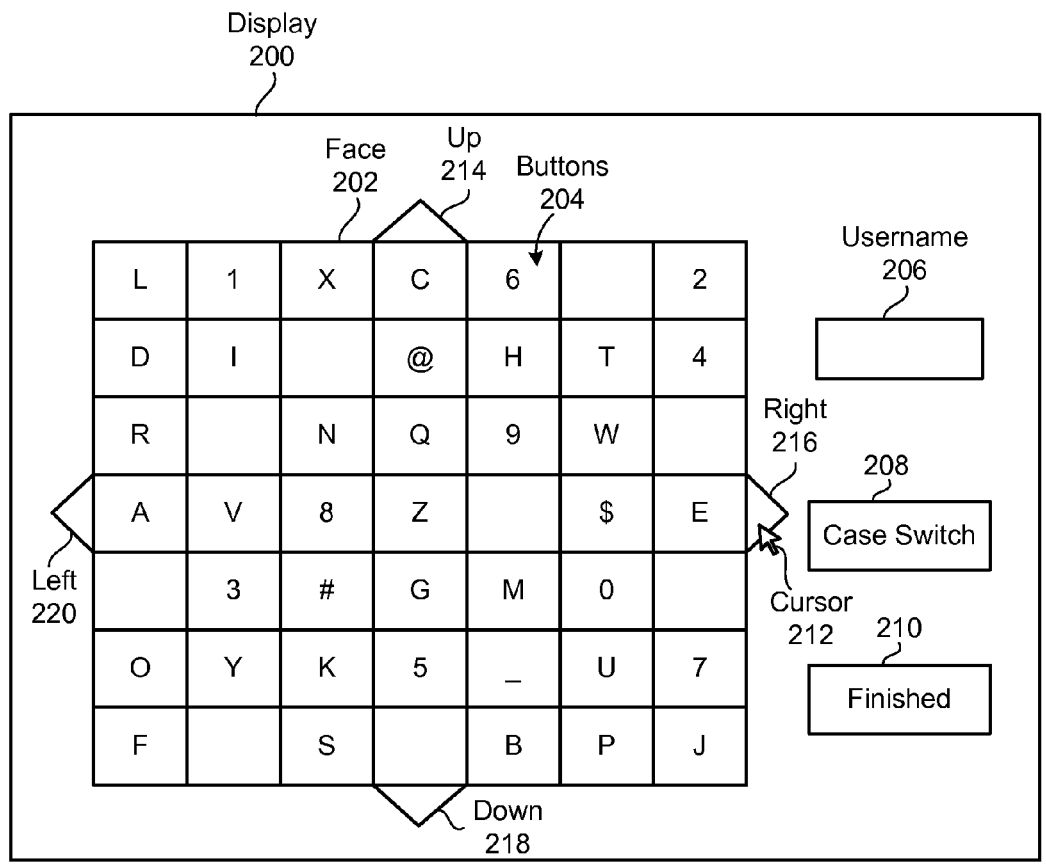

In the example shown in FIG. 4C, the user may rotate the polyhedron to the right, by clicking on, tapping, or contacting the right arrow button 216. The computing system 100 may respond to the user clicking on the right arrow button 216 by rotating the polyhedron to the right to show the next face. In an example in which the polyhedron is a cube, the computing system 100 may rotate the cube ninety degrees to present the next face to the user. In an example in which the computing system 100 stores and/or compares the rotational path of the polyhedron, the computing system 100 may store the rotation to the right. The computing system 100 may also maintain or store which face is presented to the user in response to the rotation. Depending on how the faces are numbered, the faces presented to the user after the rotation to the right may be considered a second side or face denoted '2'.

Figure 4D:
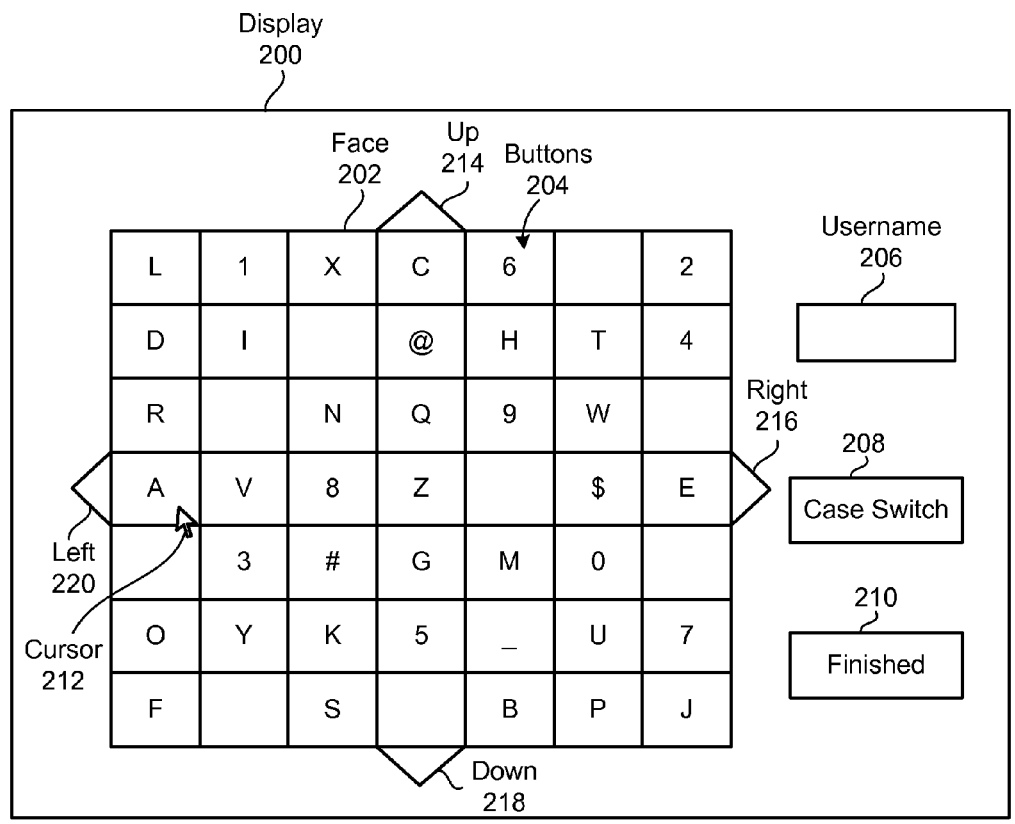

In the example shown in FIG. 4D, the user may select the character, "A", by clicking on, tapping, or contacting the button 204 that includes or displays the letter "A". Based on the user's selection of the character "A" after rotating the polyhedron once to the right to display the second side or face, the computing system 100 may store the selection as "A(2)" and/or as "A(P4)".

Figure 4E:
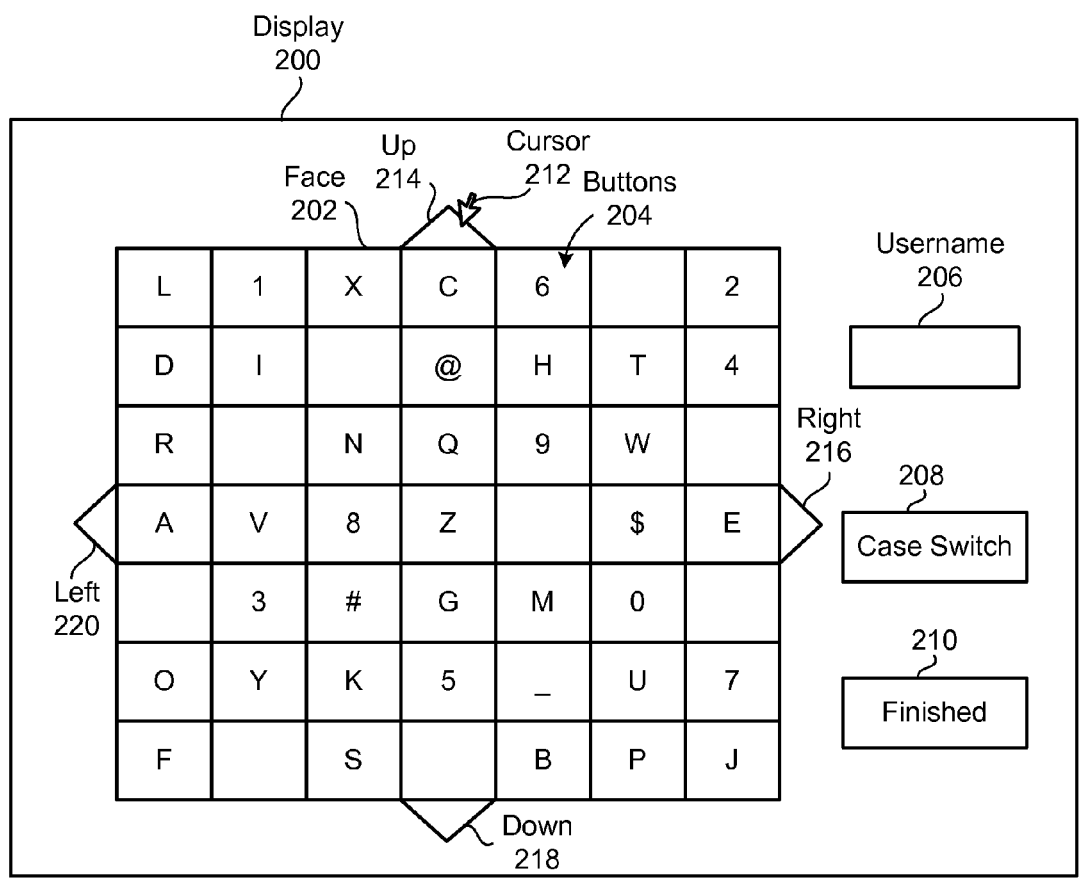
Figure 4F:
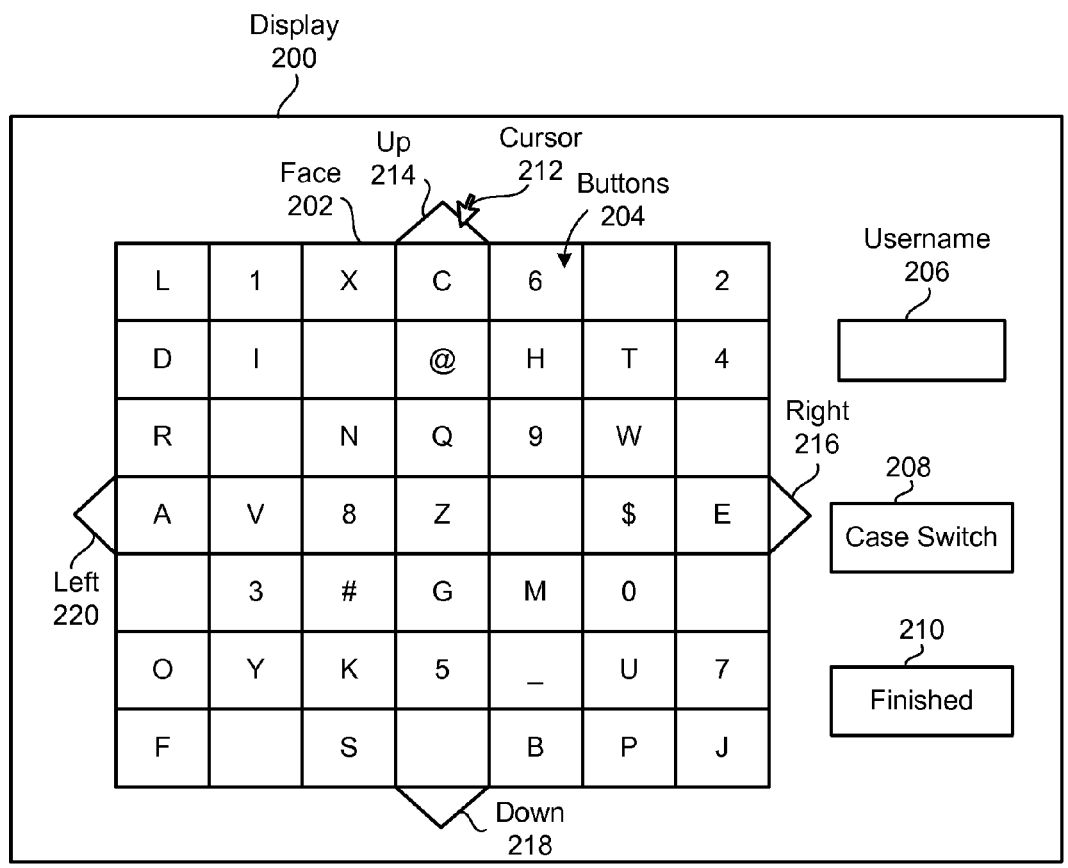

In the example shown in FIG. 4E, the user may rotate the polyhedron up, by clicking on, tapping, or contacting the up arrow button 214. The computing system 100 may respond to the user clicking on the up arrow button 214 by rotating the polyhedron up to show the next face. In an example in which the polyhedron is a cube, the computing system 100 may rotate the cube ninety degrees up to present the next face to the user. The computing system 100 may store the upward rotation, and/or maintain or store the new face presented to the user, which may be denoted '3' depending on how the sides or faces are numbered.

In the example shown in FIG. 4F, the user may again rotate the polyhedron up, by clicking on, tapping, or contacting the up arrow button 214. The computing system 100 may again respond to the user clicking on the up arrow button 214 by rotating the polyhedron up to show the next face. In an example in which the polyhedron is a cube, the computing system 100 may again rotate the cube ninety degrees up to present the next face to the user. The computing system 100 may store the upward rotation, and/or maintain or store the new face presented to the user, which may be denoted '4' depending on how the sides or faces are numbered.

Figure 4G:
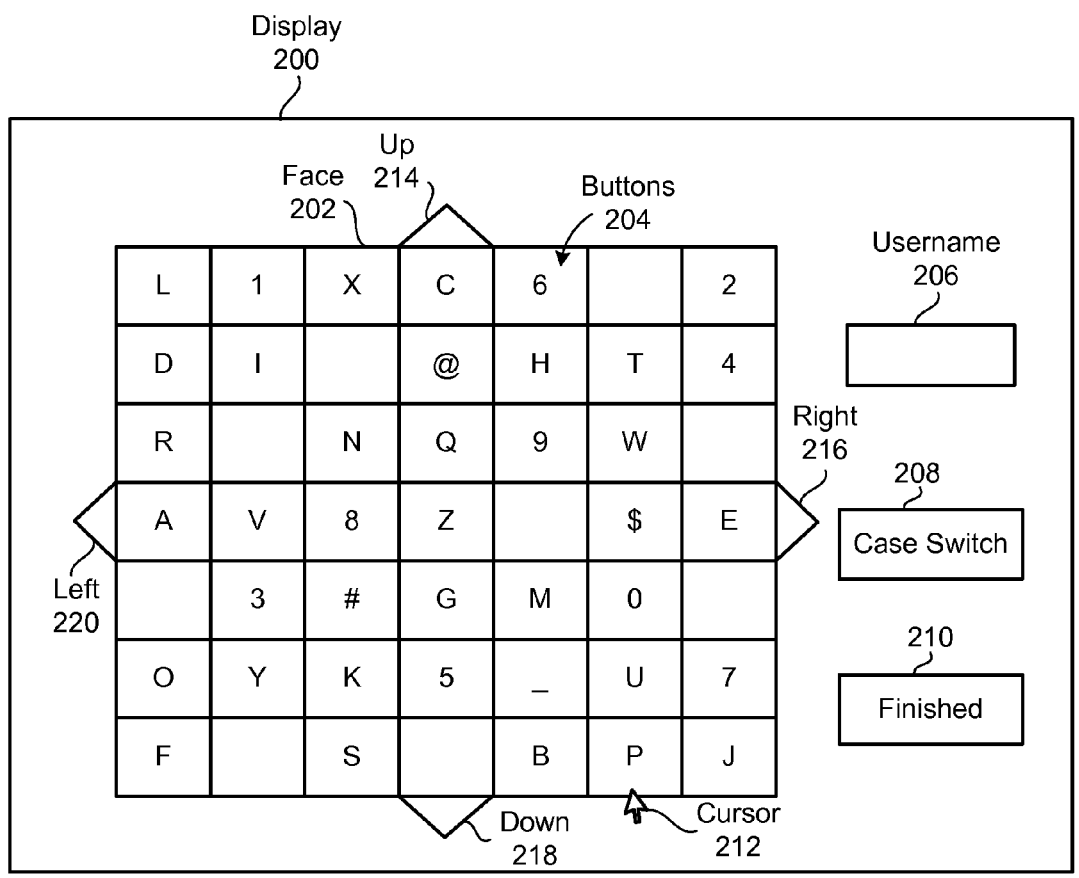

In the example shown in FIG. 4G, the user may select the character, "P", by clicking on, tapping, or contacting the button 204 that includes or displays the letter "P". Based on the user's selection of the character "P" after rotating the polyhedron twice upward to display the fourth side or face, the computing system 100 may store the selection as "P(4)" and/or as "P(P6)".

Figure 4H:
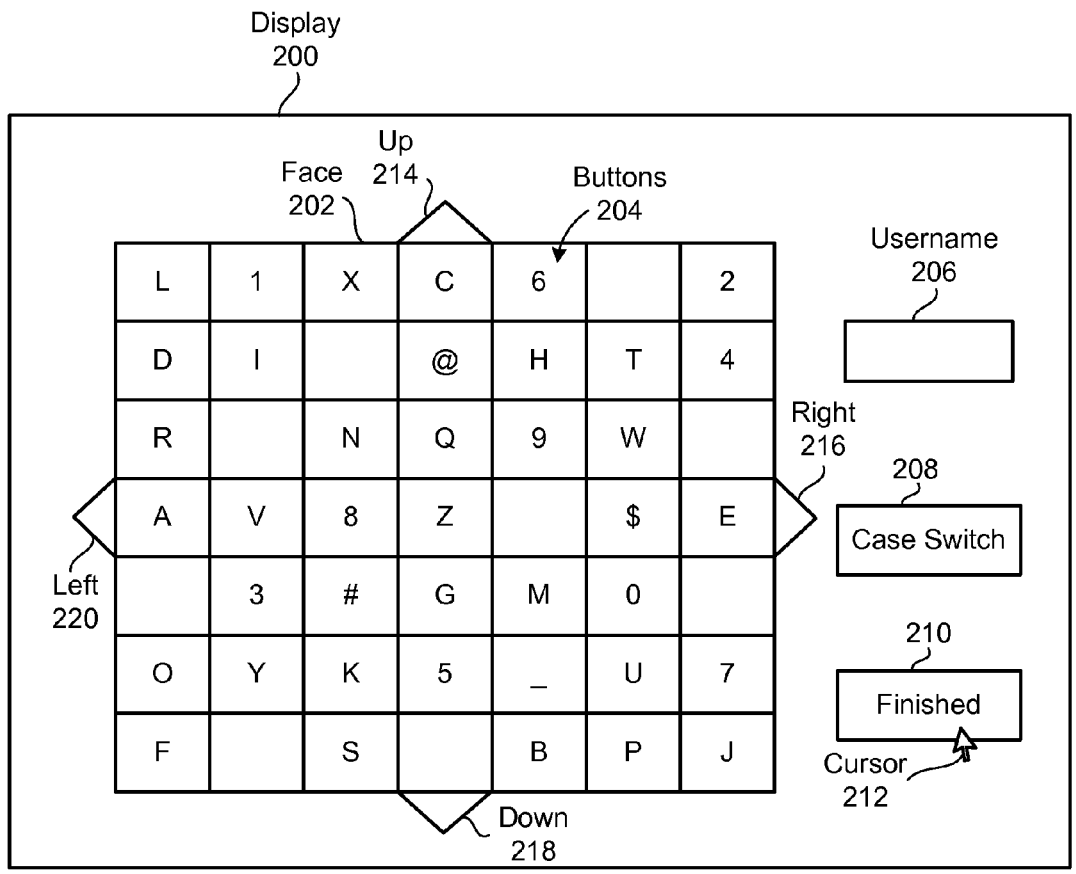

In the example shown in FIG. 4H, the user may click, tap, or contact the finished button 210. Clicking, tapping, or contacting the finished button 210 may indicate that the user is finished entering his passcode. In response to the user clicking, tapping, or contacting the finished button 210, the GUI interactor 118 of the computing system 100 may store and/or pass the passcode to the comparator 120. The GUI interactor 118 of the computing system 100 may store and/or pass the entered passcode to the comparator 120 as "S(1)A(2)P(4)" in an example in which the faces from which the characters are selected and stored and/or compared, and/or as "S(P1)A(P4)P(P6)" in an example in which the paths to the faces from which the characters are selected and stored and/or compared. The comparator 120 of the computing system 100 may then compare the passcode to a stored passcode associated with the user JOHNDOE, and dependent on whether the entered passcode matches the stored passcode, pass a "match" or "no match" to the authenticator 122. The authenticator 122 may then authenticate or not authenticate, such as by granting or denying a logon request, to the user, based on whether the authenticator received a match or no match from the comparator 120.

The rotation of the polyhedron, and selection of passcode characters from different faces of the polyhedron, allows the user to obfuscate the passcode characters across multiple faces of the polyhedron. In the example in which the polyhedron is a cube, and the computing system 100 stores and compares the faces from which the characters were selected, $6^N$ combinations of faces are possible for a given passcode, where N is the number of characters in the passcode. In the example of the eight-character passcode "sunshine," approximately 1.7 million combinations of face selections are possible, reducing the likelihood of a hacker correctly guessing the passcode. In the example in which the polyhedron is a cube, and the computing system stores and compares the directional path by which the user selects the characters, $45^N$ combinations of directional paths are possible for a given passcode, where N is the number of characters in the passcode. In the example of the eight-character passcode "sunshine," approximately 16.8 trillion combinations of directional paths are possible, reducing the likelihood of a hacker correctly guessing the passcode even more.

Figure 5:
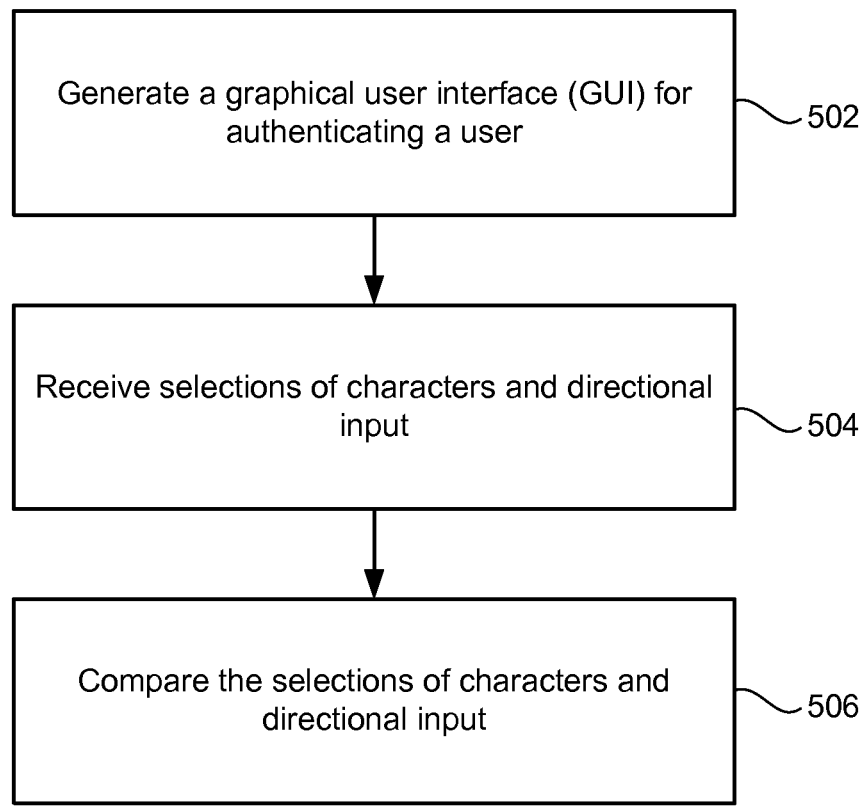
FIG. 5 is a flowchart showing a method according to an example implementation.

FIG. 5 is a flowchart showing a method according to an example implementation. In this example, the method may include generate a graphical user interface (GUI) for authenticating a user (502). The GUI may include at least one face, and a plurality of buttons inside the at least one face, at least some of the plurality of buttons including characters in a random or pseudorandom sequence. The GUI may configured to receive selections of the characters and directional input to the at least one face. The method may also include receiving the selections of the characters and the directional input (504). The method may also include comparing the selections of the characters and the directional input to a stored passcode combination (506). The comparing the selections of the characters and directional input to the stored passcode combination may authenticate the user if the characters and directional input match the stored passcode.

According to an example implementation, the buttons may be rectangular.

According to an example implementation, some of the buttons may not include characters and may be non-selectable.

According to an example implementation, the selections of the characters may include mouse clicks on the buttons.

According to an example implementation, the directional input may include at least one selection of either the at least one face or at least one other face.

According to an example implementation, the directional input may include a rotation to a second face, the second face including a second plurality of buttons inside the second face, at least some of the second plurality of buttons including the characters in the random or pseudorandom sequence.

According to an example implementation, the directional input may include a plurality of rotations to other faces.

According to an example implementation, the GUI may include a polyhedron, the polyhedron including the at least one face and a plurality of other faces, each of the at least one face and the plurality of other faces may a respective plurality of buttons, at least some of the plurality of buttons inside the at least one face and plurality of other faces including the characters in the random or pseudorandom sequence, and the directional input may include rotations of the polyhedron to change which of the at least one face and plurality of other faces is facing outward from a display of the computing system.

According to an example implementation, the GUI may include a cube, the cube including the at least one face and a plurality of other faces, each of the at least one face and the plurality of other faces may include a respective plurality of buttons, at least some of the plurality of buttons inside the at least one face and plurality of other faces including the characters in the random or pseudorandom sequence, and the directional input may include rotations of the cube to change which of the at least one face and plurality of other faces is facing outward from a display of the computing system.

According to an example implementation, each of the at least one face and plurality of other faces may include a same pattern of the characters in the random or pseudorandom sequence.

According to an example implementation, the method may further include receiving a username in association with a login attempt. The stored passcode combination to which the selections of the characters and the directional input are compared may be associated with the received username.

Figure 6:
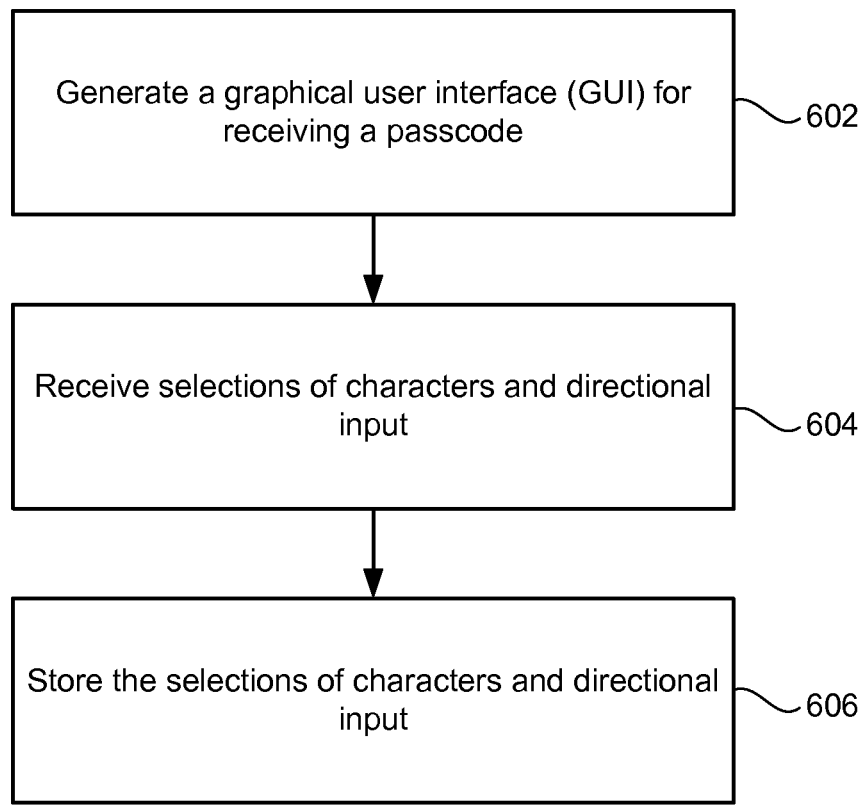
FIG. 6 is a flowchart showing a method according to another example implementation.

FIG. 6 is a flowchart showing a method according to another example implementation. The method may include generating a graphical user interface (GUI) for receiving a passcode (602). The GUI may include at least one face, a plurality of buttons inside the at least one face. At least some of the plurality of buttons may include characters in a random or pseudorandom sequence. The GUI may be configured to receive selections of the characters and directional input to the at least one face. The method may also include receiving the selections of the characters and the directional input (604). The method may also include storing the selections of the characters and the directional input for later comparison during a login attempt (606).

According to an example implementation, the GUI may include a cube with six faces. Each of the six faces may include the plurality of buttons including the characters in a same random or pseudorandom sequence.

According to an example implementation, the storing may include storing a face identifier in association with each of the selected characters.

According to an example implementation, the directional input may include directional identifiers. The storing may include storing one or more directional identifiers in association with each of the selected characters.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A non-transitory computer-readable storage medium comprising instructions stored thereon that, when executed by at least one processor, are configured to cause a computing system to at least:
   generate a graphical user interface (GUI), the GUI including:
      a polyhedron, the polyhedron including at least one face and a plurality of other faces; and
      a plurality of buttons inside the at least one face and the plurality of other faces, at least some of the plurality of buttons including characters in a random or pseudorandom sequence, the characters on the plurality of other faces being the same and in a same sequence as the characters on the at least one face, a new random or pseudorandom sequence of the characters being generated when a new instance of the polyhedron is generated,
      the GUI being configured to receive selections of the characters and directional input to the at least one face and the plurality of other faces;
   receive the selections of the characters and the directional input; and
   compare the selections of the characters and the directional input to a stored passcode combination.

2. The non-transitory computer-readable storage medium of claim 1, wherein the buttons are rectangular.

3. The non-transitory computer-readable storage medium of claim 1, wherein some of the buttons do not include characters and are non-selectable.

4. The non-transitory computer-readable storage medium of claim 1, wherein the selections of the characters include mouse clicks on the buttons.

5. The non-transitory computer-readable storage medium of claim 1, wherein the directional input includes at least one selection of either the at least one face or one of the plurality of other faces.

6. The non-transitory computer-readable storage medium of claim 1, wherein the directional input includes a rotation to a second face of the plurality of other faces, the second face including a second plurality of buttons inside the second face, at least some of the second plurality of buttons including the characters in the random or pseudorandom sequence.

7. The non-transitory computer-readable storage medium of claim 1, wherein the directional input includes a plurality of rotations to the plurality of other faces.

8. The non-transitory computer-readable storage medium of claim 1, wherein:
   the directional input includes rotations of the polyhedron to change which of the at least one face and plurality of other faces is facing outward from a display of the computing system.

9. The non-transitory computer-readable storage medium of claim 1, wherein:
   the GUI includes a cube, the cube including the at least one face and the plurality of other faces; and
   the directional input includes rotations of the cube to change which of the at least one face and plurality of other faces is facing outward from a display of the computing system.

10. The non-transitory computer-readable storage medium of claim 1, further configured to cause the computing system to receive a username in association with a login attempt, the stored passcode combination to which the selections of the characters and the directional input are compared being associated with the received username.

11. A non-transitory computer-readable storage medium including instructions stored thereon for implementing a secure computer passcode interface, the instructions being configured to cause a computing system to at least:
   generate a graphical user interface (GUI) for entering a passcode, the graphical user interface including a polyhedron with multiple faces, each of the multiple faces including a plurality of shapes, at least some of the plurality of shapes on each of the multiple faces including a character, each of the multiple faces including the same characters in a same sequence as the other faces, the GUI being configured to generate a new sequence of the characters when a new instance of the polyhedron is generated;
   wherein the GUI is configured to receive:
      selections of shapes representing the characters included therein; and
      directional input to change which of the multiple faces is displayed.

12. The non-transitory computer-readable storage medium of claim 11, wherein the directional input includes a rotation of the polyhedron.

13. The non-transitory computer-readable storage medium of claim 11, wherein the sequence of characters on all of the faces is a random or pseudorandom sequence.

14. The non-transitory computer-readable storage medium of claim 11, wherein the instructions are further configured to cause the computing system to compare the characters represented by the selected shapes, and the faces from which the shapes were selected, to a stored passcode.

15. The non-transitory computer-readable storage medium of claim 11, wherein the instructions are further configured to cause the computing system to compare the characters represented by the selected shapes, and the directional input, to a stored passcode.

16. A non-transitory computer-readable storage medium comprising instructions stored thereon that, when executed by at least one processor, are configured to cause a computing system to at least:
   generate a graphical user interface (GUI), the GUI including:
      a plurality of faces; and a plurality of buttons inside each of the plurality of faces, at least some of the plurality of buttons including characters in a random or pseudorandom sequence, the characters and the random or pseudorandom sequence being the same for each of the plurality of faces, a new random or pseudorandom sequence of the characters being generated when a new instance of the GUI is generated, the GUI being configured to receive selections of the characters and directional input to the at least one face;

receive the selections of the characters and the directional input; and store the selections of the characters and the directional input for later comparison during a login attempt.

17. The non-transitory computer-readable storage medium of claim 16, wherein:

the GUI includes a cube and the plurality of faces includes six faces; and each of the six faces includes the plurality of buttons including the same characters in the same random or pseudorandom sequence.

18. The non-transitory computer-readable storage medium of claim 16, wherein the storing includes storing a face identifier in association with each of the selected characters.

\* \* \* \* \*